Aug. 20, 1929.　　　　L. H. HARTMAN　　　　1,724,931
BEARING SHIELD
Filed June 8, 1927　　　2 Sheets-Sheet 1

Inventor
Louis H. Hartman
By
Attorney

Aug. 20, 1929.  L. H. HARTMAN  1,724,931
BEARING SHIELD
Filed June 8, 1927  2 Sheets-Sheet 2

Inventor
Louis H. Hartman
By Faust F. Crampton.
Attorney

Patented Aug. 20, 1929.

1,724,931

UNITED STATES PATENT OFFICE.

LOUIS H. HARTMAN, OF TOLEDO, OHIO.

BEARING SHIELD.

Application filed June 8, 1927. Serial No. 197,253.

My invention has for its object to provide an efficient means for protecting bearings of moving parts, particularly rotative parts, of machines where the machines are used in a dust laden atmosphere or operating on a pulverulent material. The invention particularly provides a means for preventing gritty substances that may be operated upon by the machine from working into the bearings of the rotative parts of the machine and thereby cause destruction of the bearings. The invention may be contained in machines of different forms and used, where the material is operated upon by the machine or used where the air becomes ladened with a pulverulent gritty material, for the protection of the bearings. To illustrate a practical application of my invention, I have selected a machine for dispensing lime, cement, and similar materials, in which the invention is embodied. The machine referred to is described hereinafter and is illustrated in the accompanying drawings.

Figures 1, 2:
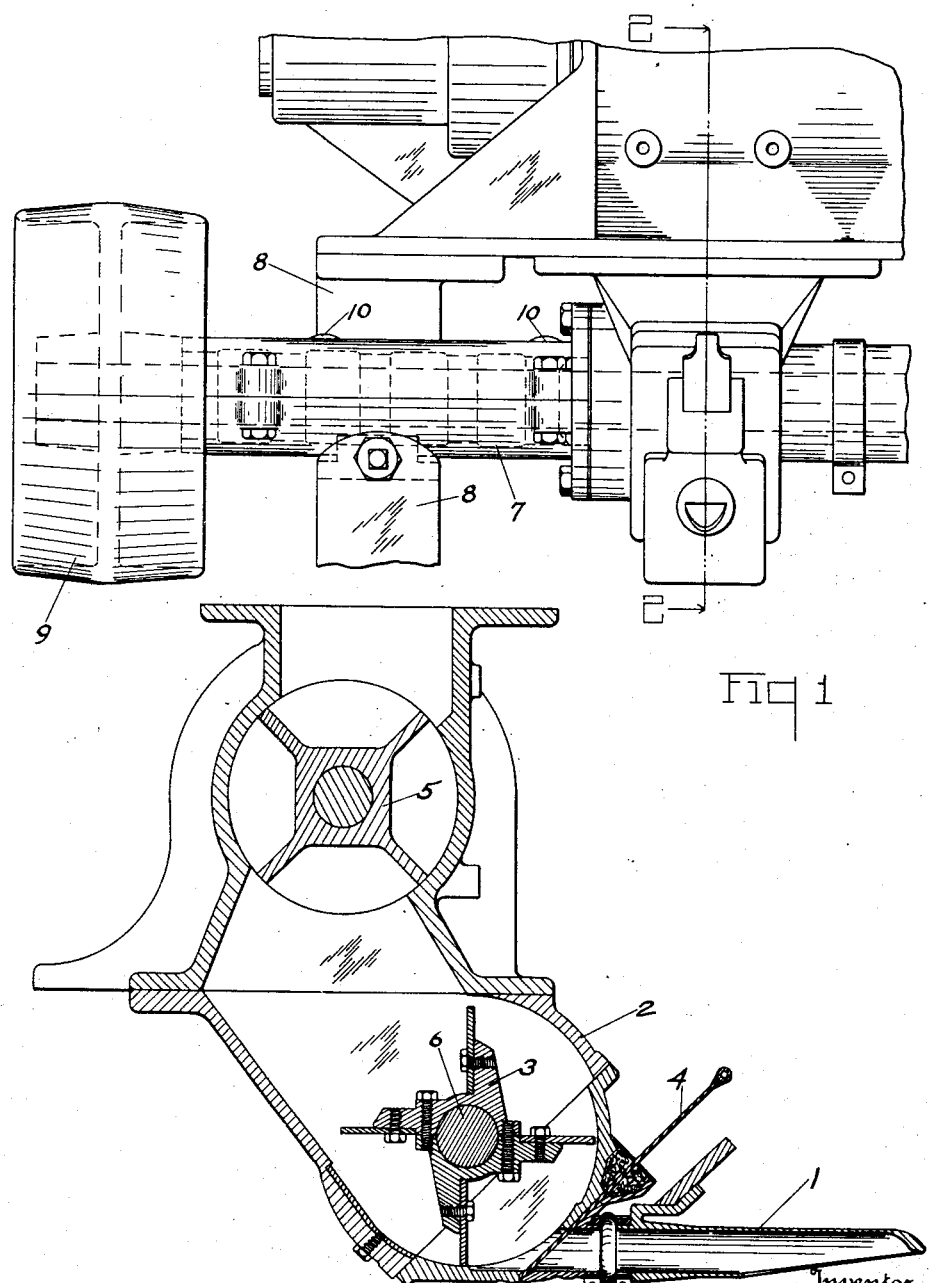
Figure 3:
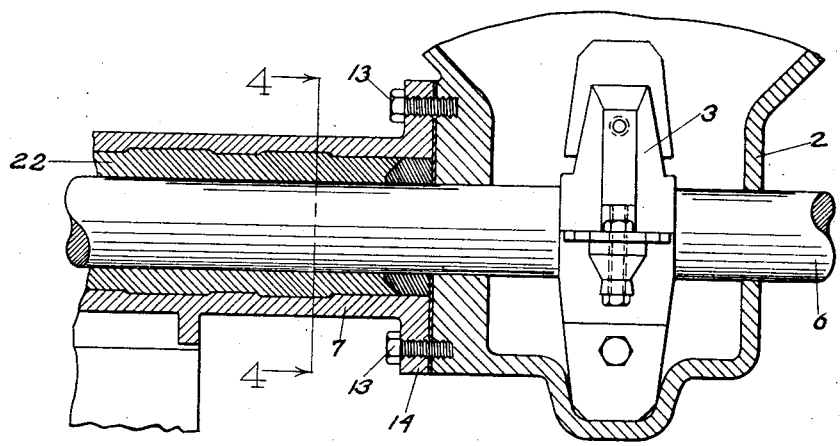
Figure 5:
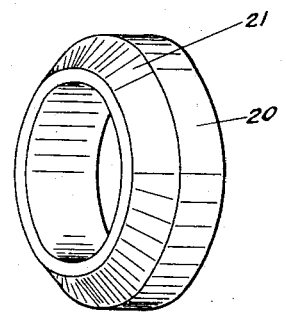
Figure 6:
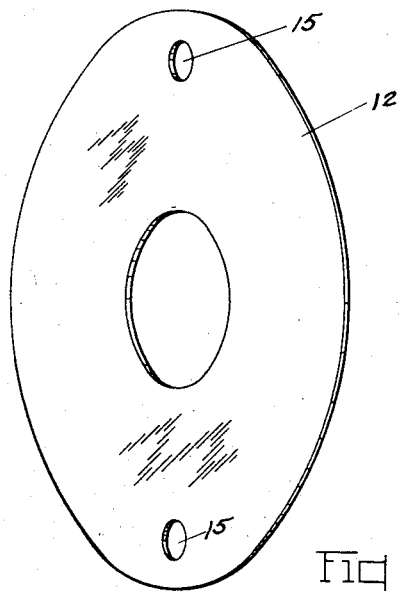
Figure 4:
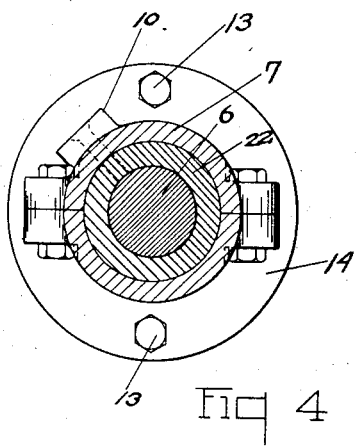

Fig. 1 illustrates a side view of a part of the dispensing machine containing my invention. Fig. 2 illustrates a view of a section taken on the plane of the line 2—2 indicated in Fig. 1. Fig. 3 is a view of a section taken through a shaft illustrated in Fig. 2 to which my invention is applied for the protection of the bearing of the shaft. Fig. 4 is a transverse section taken on the plane of the line 4—4 indicated in Fig. 3. Fig. 5 illustrates a collar that is interposed between the container for the material dispensed and the bearing parts of the shaft which extends through the container. Fig. 6 illustrates a disc which coacts with the collar illustrated in Fig. 5 to prevent the working of the material dispensed into the bearing of the shaft.

In the particular form of machine selected for purposes of illustration, a finely divided material, such as, pulverized lime, cement, or lime or cement mixtures, are dispensed through a nozzle 1 that extends from a container or shell 2 in which an ejector 3 is located. The movement of the material from the shell 2 to the nozzle 1 may be controlled by a plate 4 which is operated to open and close the outlet of the container by suitable mechanism. A feeder 5 may be also located in the casing of the machine for feeding desired quantities of the material into the shell 2 and at the same time supporting material that may be contained in bins and preventing the extreme pressures, due to the weight of the material, upon the ejector 3. The ejector 3 is rotated by a shaft 6 which is supported in bearing 7 located on parts of the frame 8 of the machine. Any suitable means may be used for operating the shaft 6, such as, a pulley wheel 9. The shaft and its bearing 22 is lubricated by oil that may be inserted in the duct 10.

The bearing 7 is located in close proximity to the shell 2 from which the material is dispensed by the operation of the ejector 3, as controlled by the shutter plate 4. Owing to the natural propensity of the material to work through even the smallest clearances and the proximity of the bearing to the case 2, ordinarily the finely divided gritty material would, except for my invention, soon find its way into the bearing 7 and destroy the bearing by the grinding action in the presence of the oil used for lubricating the bearing. This would require frequent rebabbitting or replacement of bushings and result in greatly shortening the life of the parts of the machine.

In order to overcome this movement of the material into the bearing, I have provided a thin disc 12 of hard metal that accurately fits about the shaft 6 and which is located between the shell 2 and the bearing 7. I have found that by placing a thin flexible disc 12 of hard metal, such as, hard alloys of steel, against a shoulder or collar 20 formed on or secured to a shaft, the finely divided material will not pass the disc since the pressure of the material against the disc will prevent the movement of the material into the bearing.

The disc 12 has a diameter considerably larger than the diameter of the shaft. In the form shown the diameter of the disc is about three times that of the shaft. The disc 12 is secured at points that are remote from each other which permits a slight flexure of the disc in such clearances that exist in adjoining parts of the machine. In the form shown, it is connected at only two or three points by means of machine bolts 13 that extend through a flange 14 formed on the parts of the bearing 7 and into the shell 2. The bolts 13 pass through openings 15 formed at the upper and lower edge portions of the disc 12. This leaves parts of the disc free to flex, except at its periphery where it is secured by the bolts and where it tightly fits on the shaft 6, and as may be determined by the ordinary clearances of the opposed faces of the flange 14 and the shell 2, with the result that the material will be stopped by the disc. The edge of the disc about the opening abuts against the collar 20 that is secured to and rotates with the shaft. The pressure of the material against the semi-flexible disc prevents the movement of the material into the bearing. Also, the peripheral speed of the outer surface of the collar 20, which is much greater than the surface speed of the shaft, prevents entrance of material, that may pass the disc, into the bearing. The collar, preferably, has a cone shaped surface 21 and the bearing bushing 22 has a conically cupped end 23. The cone shaped surface of the collar is located in contact with the conically cupped end 23 of the bearing sleeve and the vacuous condition created by the rotation of the cone portion of the collar also coacts to prevent the material from entering the bearing.

I claim:

1. In combination with a casing for containing a pulverulent material under pressure, a shaft extending through a wall of the said casing, a bearing part located in juxtaposed relation to the wall of the casing and having a bushing, a collar having one end located in contact with one end of the bushing and a flexible disc having an opening fitting the shaft and secured between the bearing and the casing, the edge portion of the disc about the said opening being adapted to be forced against the other end of the said collar by the pressure of the pulverulent material.

2. In combination with a casing for containing a pulverulent material under pressure, a shaft extending through a wall of the said casing, a bearing part located on the outside of and in juxtaposed relation to the wall, and having a bushing conically cupped at one end, a collar having a conical end located in the conically cupped end of the bushing and between the casing and the bushing, a flexible plate located intermediate the wall of the casing and the collar, and surrounding the shaft and subject to the pressure of the pulverulent material to press its inner edge about the shaft against the collar.

3. In combination with a casing for containing a material under pressure, a shaft extending through a wall of the said casing, a bearing part located on the outside of and in juxtaposed relation to the wall, a bushing located within the bearing part, the end of the bushing nearer to the wall having a female conical surface, a collar, the collar having a male conical end surface and located in and fitting the conical surface of the bushing, the collar located between the wall and the bushing, and means for pressing the conical surfaces against each other in proportion to the pressure of the material within the casing.

In witness whereof I have hereunto signed my name to this specification.

LOUIS H. HARTMAN.